R. W. WHITNEY.
Churn.
No. 39,205.
Patented July 7, 1863.
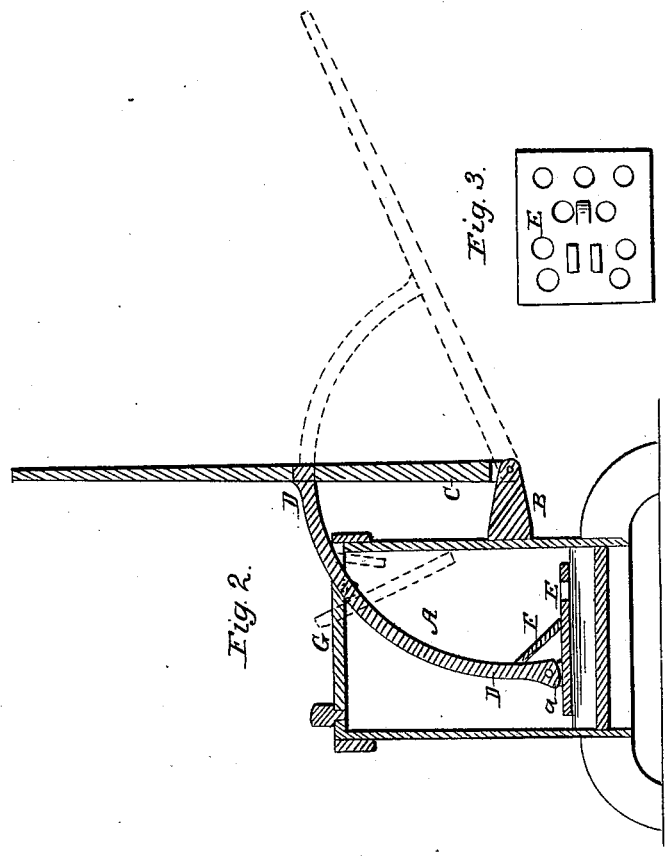
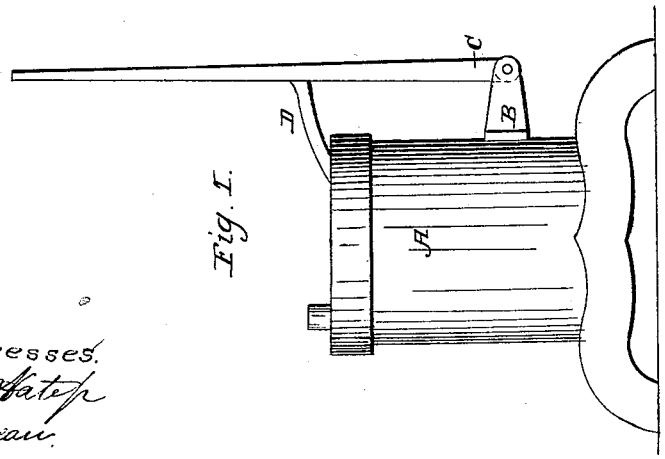

UNITED STATES PATENT OFFICE.

RUEL W. WHITNEY, OF SOUTH BERWICK, MAINE, ASSIGNOR TO HIMSELF AND A. GRAFTON NEALLEY.

IMPROVEMENT IN CHURNS.

Specification forming part of Letters Patent No. 39,205, dated July 7, 1863.

*To all whom it may concern:*

Be it known that I, RUEL W. WHITNEY, a resident of South Berwick, in the county of York and State of Maine, have invented an Improved Churn for Manufacturing Butter from Cream; and I do hereby declare the same to be fully described in the following specification, and represented in the accompanying drawings, of which—

Figure 1 is a side elevation, and Fig. 2 a vertical section, of it.

In the said drawings, A denotes the churn-reservoir, or receptacle for the cream to be churned, it being made square or rectangular in its horizontal section. From one side of it an arm, B, extends, and has the lower end of a lever, C, hinged to it. At or about at the middle part of the said lever an arm, D, is fastened and is curved with a radius whose center is at the axis of the hinge of the lever C and the arm B. The said curved arm D projects over the top of and into the reservoir A, as shown in the drawings, and at its lower end is hinged to a dasher or perforated board, E, a top view of which is represented in Fig. 3. The connection of the dasher and the curved arm is nearer to one than to the other end of the dasher, it being about half-way between the center of the dasher and that end of it which is farthest from the arm B. This arrangement of the connection affords advantages in the operation of the dasher, as well as in the construction of the churn. A strut, E, projects from the curved arm and toward the dasher in manner as shown in Fig. 2. This strut not only serves as an abutment for the dasher, while it may be in the act of being pressed downward against the cream, but answers as a stop for the curved arm when the dasher is elevated to its highest altitude, in which case the several parts will have the positions as represented by the red lines in Fig. 2. That end of the curved arm which is next to the dasher is formed as shown at *a* in Fig. 2, in order that the dasher while in the act of being raised within the churn-reservoir may bring up against such end and turn no farther on the arm. This causes the dasher to operate to better advantage in the cream than it would were it allowed to turn farther or freely on the arm without any such check. By laying hold of the lever and vibrating it toward and away from the reservoir, the dasher will be worked up and down therein, and when the dasher may be raised to its highest position free access may be had to the cream and butter without the necessity of removing the dasher from the reservoir. The dasher works through a notch in the movable cover G, applied to the top of reservoir.

I claim—

The improved churn as not only constructed with the lever C and the curved arm D, arranged relatively to the reservoir A and the dasher E, as specified, but as having the strut F combined and arranged with the curved arm D and the dasher E so as to operate substantially as described.

RUEL W. WHITNEY.

Witnesses:
JOHN B. NEALLEY,
A. GRAFTON NEALLEY.